United States Patent
Marca

(10) Patent No.: US 6,230,687 B1
(45) Date of Patent: May 15, 2001

(54) METHOD FOR FUEL INJECTION FOR STARTING AN INTERNAL COMBUSTION ENGINE

(75) Inventor: Christian Marca, Tournefeuille (FR)

(73) Assignee: Siemens Automotive S.A., Toulouse-Cedex (FR)

( * ) Notice: Subject to any disclaimer, the term of this patent is extended or adjusted under 35 U.S.C. 154(b) by 0 days.

(21) Appl. No.: 09/462,551

(22) PCT Filed: Jun. 26, 1998

(86) PCT No.: PCT/EP98/03924

§ 371 Date: Jan. 7, 2000

§ 102(e) Date: Jan. 7, 2000

(87) PCT Pub. No.: WO99/02832

PCT Pub. Date: Jan. 21, 1999

(30) Foreign Application Priority Data

Jul. 7, 1997 (FR) ................................................. 97 08572

(51) Int. Cl.[7] ............................ F02D 41/06; F02D 41/34
(52) U.S. Cl. ............................................................. 123/491
(58) Field of Search ........................... 123/179.16, 478, 123/480, 491; 701/104

(56) References Cited

U.S. PATENT DOCUMENTS

| | | | |
|---|---|---|---|
| 4,508,083 | * 4/1985 | Hasegawa et al. | 123/491 |
| 4,732,122 | * 3/1988 | Scarnera et al. | 123/491 X |
| 4,941,449 | * 7/1990 | Hoptner et al. | 123/491 X |
| 4,998,522 | * 3/1991 | Achleitner | 123/491 |
| 5,245,972 | 9/1993 | Denz et al. | 123/478 |
| 5,390,641 | * 2/1995 | Yamada et al. | 123/491 |

FOREIGN PATENT DOCUMENTS

| | | |
|---|---|---|
| 4317635A1 | 12/1994 | (DE) . |
| 2233709A | 1/1991 | (GB) . |

\* cited by examiner

*Primary Examiner*—Tony M. Argenbright
(74) *Attorney, Agent, or Firm*—Herbert L. Lerner; Laurence A. Greenberg; Werner H. Stemer

(57) ABSTRACT

A method for fuel injection for starting an internal combustion engine, whereby upon closure of a starting contact, fuel injectors are operated simultaneously to deliver a first amount ($ID_i$) of fuel to a number of cylinders ($C_i$) and, after a synchronization signal ($S_{cyl}$, $S_{rep}$) has been recognized, the injectors are operated sequentially. An angle of rotation (ANG) separating the angular position (START) of the engine upon closure of the starting contact from the angular position (SYNC) reached upon recognition of the synchronization signal is measured. This angle is compared with a predetermined value (THR), and when the angle of rotation is greater than the predetermined value, an additional amount (CMP) of fuel is injected into a cylinder ($C_2$) determined on the basis of the cylinder ($C_3$) in respect of which the synchronization signal was recognized.

4 Claims, 1 Drawing Sheet

METHOD FOR FUEL INJECTION FOR STARTING AN INTERNAL COMBUSTION ENGINE

BACKGROUND OF THE INVENTION

FIELD OF THE INVENTION

The subject of the present invention is a method for fuel injection for starting an internal combustion engine and, more specifically, a method allowing quick jolt-free starting even at very low temperature.

Multi-cylinder four-stroke internal combustion engines are currently operated on the so-called sequential injection principle. In this method, one injector is associated with each cylinder and this injector is operated on the basis of the angular position of the engine in the cycle so that a predetermined amount of fuel is injected into each cylinder at a precise phase in the engine cycle. To achieve this, the position of the engine is recognized on the basis of signals supplied by sensors associated with targets linked to the crankshaft and to the cam-shaft. The cylinder which is to begin its induction phase is determined, and the injector associated with this cylinder is operated in such a way that the desired amount of fuel is injected before the start of the induction phase.

However, during engine starting, the exact position of this engine is not known. A device designed to implement a method for injection for an internal combustion engine in such a way that on closure of an engine starting contact a first amount of fuel is injected simultaneously into all of the cylinders and when an engine synchronization signal is recognized the fuel is injected sequentially, one cylinder at a time, once per cycle and in a predetermined order is known from French Patent Application 2 516 982.

It has, however, been observed that misfires could occur in one of the cylinders and lead to the engine slowing down and even sometimes stalling, particularly under extreme cold start conditions.

SUMMARY OF THE INVENTION

The present invention therefore proposes a method for controlling the injection of fuel into an internal combustion engine which does not carry this risk of misfires and thus allows quick and assured engine starting regardless of the operating conditions.

These objects of the invention, together with others which will become clear in what follows of the present description, are achieved by means of a method for fuel injection for starting an internal combustion engine in which, upon closure of a starting contact, fuel injection means are operated simultaneously to deliver a first amount of fuel to a number of cylinders and, after a synchronization signal has been recognized, said injection means are operated sequentially. According to the invention, an angle of rotation separating the angular position of the engine upon closure of the starting contact from the angular position reached upon recognition of the synchronization signal is measured, this angle is compared with a predetermined value, and when the angle of rotation is greater than the predetermined value, an additional amount of fuel is injected into a cylinder determined on the basis of the cylinder in respect of which the synchronization signal was recognized.

According to an important feature of the invention, the predetermined value is calculated on the basis of the angular advance of a mark identifying the top dead center position of a cylinder with respect to the actual position of this top dead center and of a delay in the closing of an inlet valve of this cylinder.

According to another feature of the invention, the additional amount of fuel is injected into the cylinder which, in the cycle, immediately precedes the cylinder in respect of which the synchronization signal was recognized.

According to another feature of the invention, the additional amount of fuel is a function of the first amount delivered and of the angular difference between the angular position of the engine upon closure of the starting contact and the angular position reached upon recognition of the synchronization signal.

BRIEF DESCRIPTION OF THE DRAWINGS

Other features and advantages of the method according to the invention will become clear from reading the description which will follow and from examining the appended drawings, in which.

DESCRIPTION OF THE PREFERRED EMBODIMENTS

Figure 1:
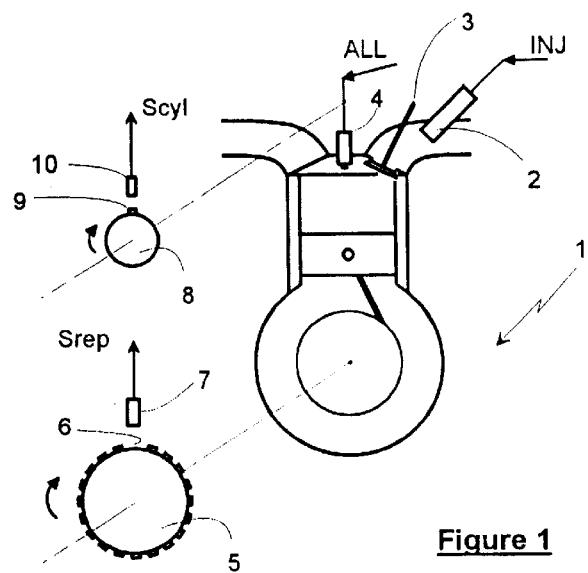
FIG. 1 depicts a diagram of an internal combustion engine.

Reference is made to FIG. 1 which depicts an internal combustion engine 1 equipped with fuel-injection means 2, inlet valves 3 and exhaust valves (not depicted) and ignition means 4. The figure also depicts a target 5 secured to the crankshaft comprising, at its periphery, evenly spaced teeth from which one tooth is missing, thus making it possible to create a top dead center mark 6 which can be detected by a rotational-speed sensor 7 delivering a signal $S_{rep}$. In the example of a four-cylinder four-stroke engine, the crankshaft makes two revolutions per engine cycle, and so detection of the mark 6 associated with the target 5 secured to the crankshaft does not make it possible to determine which of two cylinders, for example C1 and C3, is at top dead center following an induction phase. Thus, a target 8 connected to the camshaft makes it possible, upon detection of a mark 9 by a sensor 10, to provide a signal $S_{cyl}$ which determines the cylinder and clarifies the uncertainty, this target effecting one revolution per engine cycle. Advantageously, the marks 6 and 9 are arranged in such a way as to be detected simultaneously by the sensors 7 and 10 in the case of a first revolution of the engine in the cycle, the mark 6 being the only one present during the next revolution. Likewise, the position of the marks on the targets is such that they are detected with a predetermined advance angle AV (FIG. 2) with respect to the actual position of top dead center for the cylinder.

Figure 2:
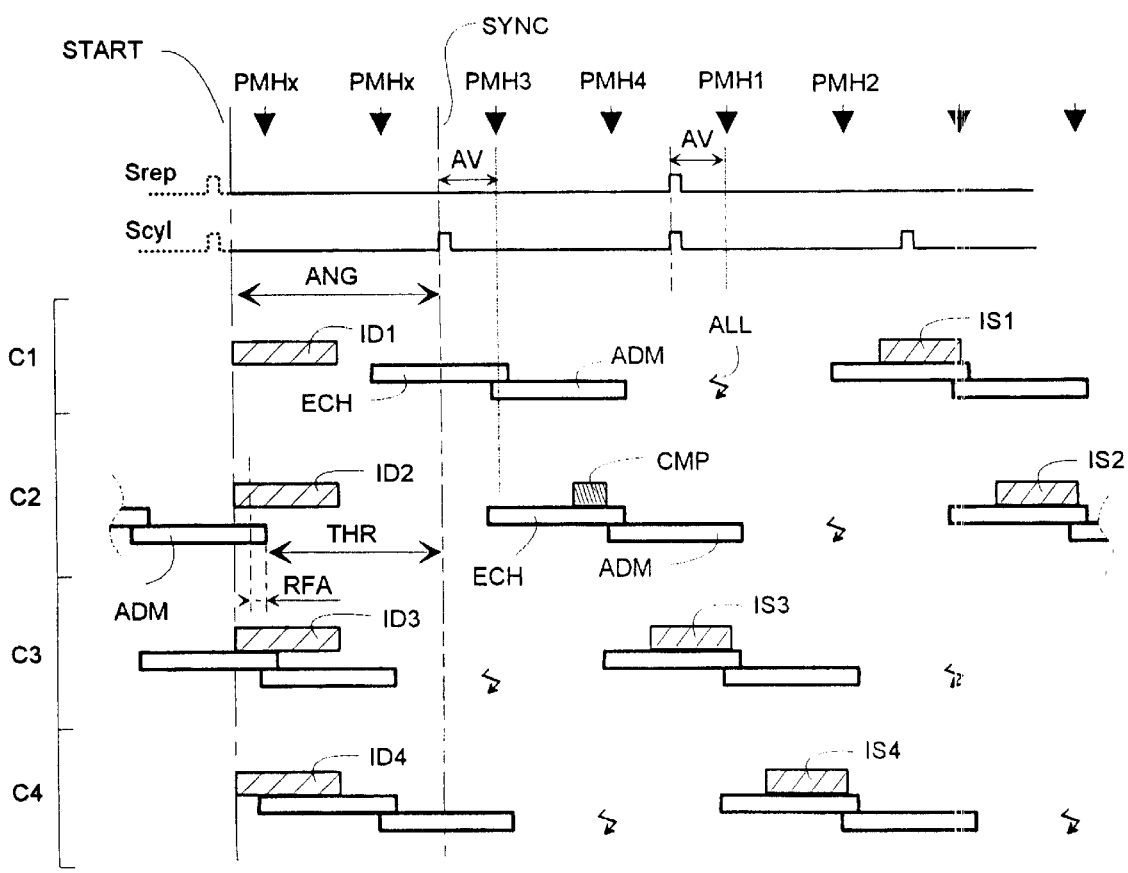
FIG. 2 depicts a diagram of the operating cycle of a four-cylinder engine and of the injection method according to the invention.

Reference is now made to FIG. 2 to explain how the injection method according to the invention works. A first row of the figure represents the position of top dead center ($PMH_i$) for each cylinder i (i=1 to 4) over two engine cycles. The next row, labeled $S_{cyl}$ represents the signal delivered by the sensor 10 opposite the target 8 associated with the engine camshaft. Likewise, represented on the next row is the signal $S_{rep}$ supplied by the sensor 7 placed facing the target 5 secured to the crankshaft. There is then represented, for each of the cylinders in turn:

the periods during which the exhaust valve $ECH_i$ and the inlet valve $ADM_i$ of the cylinder are open, the periods during which the injector associated with said cylinder is open, and the position at which an ignition spark ALL is supplied to the ignition means associated with the cylinder concerned.

Upon closure of a starting contact, depicted in the figure as a vertical LINE labeled START, the injectors are operated simultaneously to deliver a first amount of fuel $ID_i$ to each cylinder. The engine is driven on its starter motor through an angle ANG until a top dead center mark is detected by the signal $S_{rep}$. At this moment, analysis of the signals $S_{cyl}$ and $S_{rep}$ makes it possible to identify that the next cylinder to reach PMH will be the cylinder C3. This detection is performed with a predetermined angle of advance AV, for example 90°, with respect to the actual position of top dead center for the cylinder. In consequence, the precise position of the engine is determined, and this is depicted as a vertical chain line labeled SYNC and a first ignition spark can be generated in the cylinder C3 near its top dead center $PMH_3$. Any ambiguity relating to the succession of the cylinders in the cycle is clarified and an ignition spark and a command to open the injectors may be delivered to each cylinder in turn.

However, on examination of the situation in respect of the cylinder C2, it is found that as soon as the starter contact closes, the injection amount $ID_2$ injected into the cylinder C2 was injected during a phase during which the inlet valve was open. Thus, a certain amount of fuel has entered the cylinder. As no ignition spark has been delivered to this cylinder because the first cylinder recognized was the cylinder C3, the amount of fuel which entered the cylinder C2 during the starting injection is expelled during the next exhaust phase of this cylinder without participating in combustion. Thus, during the next combustion stroke in the cylinder C2, the amount of fuel participating in combustion is cut down by the amount expelled during the exhaust phase. The mixture will therefore be lean and may lead to misfires, which will cause the engine speed to slow down during the critical phase of turning it over. This slowing-down may lead the engine to stall, particularly under extreme cold start conditions when friction associated with the viscosity of the lubricant is at its maximum and the energy delivered by the battery to the starter motor is at its minimum. To avoid the mixture in the cylinder C2 becoming lean in this way, an additional amount of fuel CMP capable for compensating for this reduction in richness is injected, according to the invention, before the next induction phase in this cylinder. The next combustion in the cylinder C2 will therefore occur in the presence of an air/fuel mixture whose richness will be corrected and made the same as the richness in the other cylinders. It may be seen that the amount of fuel which has entered the cylinder C2 during the starting injection $ID_2$ and expelled during the subsequent exhaust phase before combustion could take place, depends on the angular position of the engine at the starting instant START with respect to the cycle governing the opening of the valves of this cylinder.

The angular distance between closure of the valve of the cylinder C2 and the position of the engine at the instant of synchronization is a predetermined value THR which acts as a threshold for triggering the additional injection of fuel. This value is defined during engine manufacture and depends only on the induction closure delay RFA, a parameter which is determined by the timing of the engine and on the angular advance of the top dead center mark 6 borne by the target 5 with respect to the actual position of this top dead center.

So, if the angular position of the engine at the moment that it starts is separated by an angular distance ANG higher than this threshold value THR an additional injection will be made into the cylinder C2. When the starting injection $ID_2$ takes place after the inlet valve of the cylinder C2 has closed, that is to say for an angular distance ANG smaller than this threshold value THR, there is no fuel entering this cylinder and it is therefore not necessary to perform an additional injection.

The additional amount of fuel CMP to be injected depends on the proportion of the first amount injected upon starting, this proportion being determined as is known per se by engine bench tests according to the temperature of the coolant, which has been injected during the time that the inlet valve was open. Assuming the fuel delivery delivered by the injection means to be roughly constant during the period for which they are open, it will be understood that this proportion depends on the difference between the angular distance ANG and the threshold value THR.

Of course, in the example which has just been described, the basis was synchronizing the engine on the mark immediately preceding (and associated with) the cylinder C3. It will be immediately obvious to the person skilled in the art that the same process can be shifted by one engine revolution (360° crank angle). The engine will then be synchronized by recognizing the simultaneous presence of the marks $S_{rep}$ and $S_{cyl}$, identified with the mark associated with the cylinder C1. In this case, the cylinder liable to have additional fuel CMP injected into it is the cylinder C4 which immediately precedes the cylinder C1 in the cycle. Of course, the invention is not restricted to the embodiment described and depicted which has been given merely by way of example. The method according to the invention may be applied to any four-stroke engine having at least three cylinders.

What is claimed is:

1. A method of injecting fuel for starting an internal combustion engine, which comprises:

upon a closure of a starting contact, simultaneously operating fuel injection devices to deliver a first amount of fuel to a plurality of cylinders and, after a synchronization signal has been recognized, operating the fuel injection devices sequentially;

measuring an angle of rotation separating an angular position of an internal combustion engine upon closure of the starting contact from the angular position reached upon recognizing the synchronization signal;

comparing the angle of rotation with a predetermined value; and if the angle of rotation is greater than the predetermined value, injecting an additional amount of fuel into a cylinder determined on the basis of the cylinder with regard to which the synchronization signal was recognized.

2. The method according to claim 1, which comprises calculating the predetermined value based on an angular advance of a mark identifying a top dead center position of a cylinder with respect to the actual position of this top dead center and of a delay in closing an intake valve of the cylinder.

3. The method according to claim 1, wherein the injecting step comprises injecting the additional amount of fuel into that cylinder which, in the combustion cycle, immediately precedes the cylinder in respect of which the synchronization signal was recognized.

4. The method according to claim 1, which comprises setting the additional amount of fuel as a function of the first amount of fuel ($ID_i$) delivered and of the angle of rotation.

* * * * *